March 25, 1952 E. S. MacPHERSON 2,590,719
ROTATION PERMITTING ASSEMBLY FOR POPPET VALVES
Filed May 3, 1949
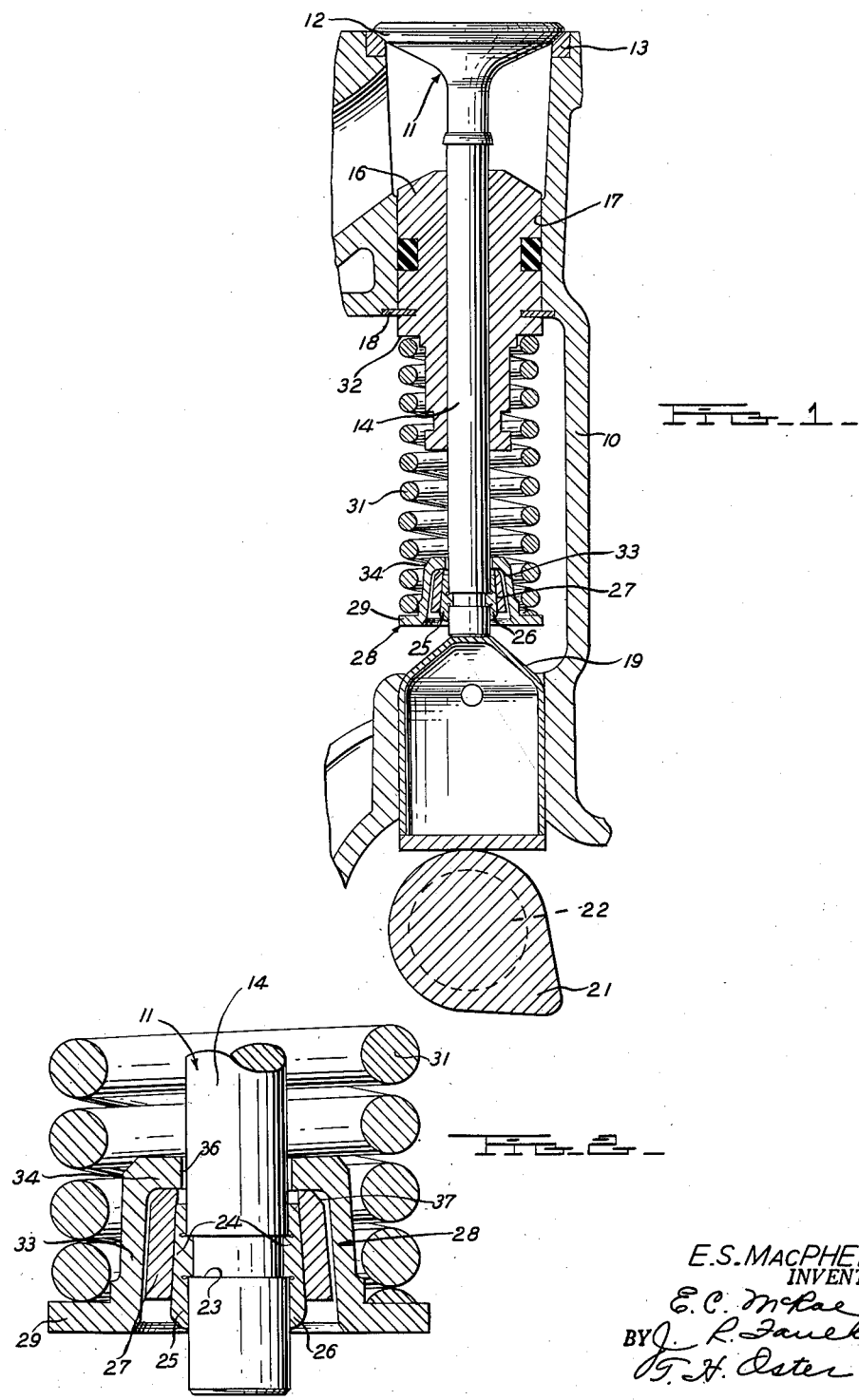
E.S. MacPHERSON
INVENTOR.
BY
ATTORNEYS Patented Mar. 25, 1952

2,590,719

UNITED STATES PATENT OFFICE 2,590,719

ROTATION PERMITTING ASSEMBLY FOR POPPET VALVES

Earle Steele MacPherson, Detroit, Mich., assignor to Ford Motor Company, Dearborn, Mich., a corporation of Delaware Application May 3, 1949, Serial No. 91,123

4 Claims. (Cl. 123—90)

This invention relates generally to valves for internal combustion engines, and particularly to valves of the type adapted to rotate during engine operation.

In recent years various valve constructions have been proposed to enable the valves of internal combustion engines to rotate slowly during engine operation. Valve rotation enables heat which otherwise would be concentrated on one side of the valve to be more uniformly distributed, and in addition prevents any one sector of the valve from remaining at a leakage or blow-by area for a sufficient period of time to locally build up excessive temperature. Valve rotation is also proposed as a means to prevent excessive deposits from building up on the valve, the valve seat and the valve stem, and to prolong the life and efficiency of the valve. Among the present types is a positively rotated valve in which a pressure plate cooperates with a series of spring urged balls located in cam grooves to positively rotate the valve a given increment during each reciprocation. Another type is the so-called free valve in which the valve is lifted completely free of spring pressure for the major portion of its lift cycle so that it will be free to rotate.

The present invention produces valve rotation in an entirely different manner. Tests have shown satisfactory results, and in addition the construction is considerably simpler and more economical to manufacture and assemble and does not require readjustment or maintenance during service. It is well-known that there is a constant tendency on the part of engine valves to rotate during their reciprocatory movement, due partially to the circulatory movement of the gases in the combustion chamber and the resulting skin friction on the valve. Valve spring twist, engine vibration, and variations in the various parts and in the operating cycle also assist in producing valve rotation. In the conventional valve construction, this tendency to rotate is successfully resisted since the valve, split keys and spring retainer are locked together, and the friction between the end of the valve spring and its seat is of sufficient magnitude to hold the locked valve assembly against rotation. While a limited valve rotation may occasionally be obtained at extremely high speeds due to valve spring surge and a resulting decreased spring load, at normal speeds the spring load acting at the radius of the spring results in sufficient friction between the spring and the spring retainer to prevent any appreciable rotation. Applicant's valve assembly, on the other hand, is designed and constructed so that the effective point of application of the valve spring pressure is at a considerably smaller radius than the radius of the valve spring, resulting in a reduced resistance to valve rotation. This is accomplished with a minimum of change in the parts conventionally used since the valves and the split keys may be identical with those presently used in conventional valve assembly. In a conventional arrangement, the valve spring retainer slips over the split keys and wedges against the conical outer surface of the latter to provide a locked valve assembly. In the present invention, however, an intermediate sleeve encircles the split keys and wedges against their outer surfaces to be locked thereto under load, and the valve spring retainer is constructed as an entirely separate piece and is arranged so that it is supported only upon one end of the intermediate sleeve. This valve spring retainer may have a radial flange for supporting the end of the valve spring, a generally axially attending sleeve portion encircling and spaced from the intermediate sleeve, and a radial flange extending inwardly from the opposite end of the sleeve portion and resting upon the adjacent end of the intermediate sleeve. With this arrangement the frictional contact between the valve spring retainer and the intermediate sleeve is in a radial plane, is rather small in area, and is located closely adjacent the valve stem and consequently at a considerably smaller radius than the radius of the valve spring. As a result the resistance to valve rotation is insufficient to prevent the valve from rotating due to the normal forces tending to rotate it, and slow valve rotation results.

Other objects and advantages of the present invention will be made more apparent as this description proceeds, particularly when considered in connection with the accompanying drawings, wherein:

Figure 1 is a fragmentary vertical cross-sectional view of an internal combustion engine showing a valve assembly incorporating the present invention.

Figure 2 is an enlarged cross-sectional view of a portion of Figure 1.

Referring now particularly to the accompanying drawings, the reference character 10 indicates generally the cylinder block of an internal combustion engine, and 11 a conventional poppet valve reciprocably mounted therein. The valve 11 has an enlarged head 12 adapted to seat upon a valve insert 13 mounted in the block, and a stem 14 slideably received within a valve guide bushing 16 mounted in a bore 17 in the block and held therein by means of a retainer 18. The lower end of the valve stem is adapted to be engaged by a tappet 19 actuated by a cam 21 on a camshaft 22. Adjacent its lower end the valve stem is provided with an angular groove 23 which receives the arcuate inwardly extending tongues 24 of a pair of identical semi-cylindrical keys 25 and 26. The construction thus far described is conventional.

The semi-cylindrical keys 25 and 26 are encircled by an intermediate retaining sleeve 27, the inner conical surface of which engages the outer conical surfaces of the keys. The resulting wedging action locks the ring and keys together under the axial load of the valve spring, and the valve stem, keys and intermediate sleeve reciprocate and rotate together.

A valve spring retainer 28 encircles the intermediate sleeve 27 and is provided with a lower radially outwardly extending flange 29 upon which the lower end of the valve spring 31 is seated. The upper end of the valve spring is engaged by an annular shoulder 32 provided in the valve guide bushing 16. The valve spring retainer 28 has a generally axially extending sleeve portion 33 extending upwardly from the lower flange 29. The sleeve portion 33 encircles the intermediate retaining sleeve 27, and a clearance space is left therebetween. At the upper end of the sleeve portion 33 the valve spring retainer is integrally formed with a radially inwardly extending upper flange 34 which is centrally apertured at 36 to receive the valve stem 14. The aperture 36 is sufficiently large to provide clearance between the upper flange 34 and the valve stem.

It will be seen from the drawings, and particularly in Figure 2, that the upper flange 34 of the valve spring retainer rests upon the upper end of the intermediate retaining sleeve 27, the contact therebetween being in a radial plane. It will also be noted that the upper end of the intermediate sleeve 27 is chamfered, as at 37, to provide adequate clearance for the fillet at the junction between the upper flange 34 and the sleeve portion 33 of the valve spring retainer 28, and also to place the zone of frictional contact between the valve spring retainer and the intermediate sleeve as close as possible to the valve stem.

It will be seen that with the construction described above the intermediate retaining sleeve 27 is wedged by the pressure of the valve spring against the semi-cylindrical keys 25 and 26 which in turn are clamped against the outer surface of the valve stem. Any tendency of the valve to rotate, either from spring twist, engine vibration or for any other reason, is imparted to the intermediate sleeve 27. The pressure of the valve spring 30, the lower end of which rests upon the lower flange 29 of the valve spring retainer 28, is transmitted to the intermediate sleeve 27 and thence to the valve stem by means of the engagement between the upper end of the intermediate sleeve 27 and the lower surface of the upper radial flange 34 of the spring retainer. The friction at this point opposes the tendency of the valve and the retaining sleeve carried thereby to rotate. This friction, however, which is a function of the spring pressure, the co-efficient of friction between the upper end of the retaining sleeve and the upper flange of the spring retainer, and the distance between the center line of the valve stem and this point of frictional engagement, is insufficient to completely resist the tendency of the valve to rotate. As a result, the valve rotates slowly during its reciprocation in the cylinder block, and it has been found by test that this rotation, which may be in the order of 2 or 3 revolutions per minute, is sufficient to substantially prolong the life and efficiency of the valve.

In addition to being simple and economical to manufacture, a further advantage of applicant's construction is that it does not require readjustment or other maintenance but remains fully operative for the life of the valve, as contrasted with other types of rotating valve constructions which either have a large number of wearing parts which may cause trouble or which must be manufactured to close tolerances and possibly adjusted during the life of the valve.

It will be understood that the invention is not to be limited to the exact construction shown and described, but that various changes and modifications may be made without departing from the spirit and scope of the invention, as defined in the appended claims.

What is claimed is:

1. A valve assembly for an internal combustion engine comprising a poppet valve having an enlarged head and an elongated cylindrical stem, said stem having an annular groove formed in its periphery near one end thereof, split keys embracing said stem and having tongues entering said annular grove to prevent relative axial movement therebetween, the exterior surface of said keys being tapered toward the head of the valve, an annular tapered sleeve encircling and embracing said split keys to clamp the latter in position upon said valve stem, the end of said sleeve facing the head of the valve lying in a radial plane and being located closely adjacent the periphery of the valve stem, a valve spring retainer seated upon the last-mentioned end of said sleeve, and a valve spring having one end supported upon said valve spring retainer in a zone radially outwardly of the zone of engagement between said retainer and said sleeve.

2. The structure defined by claim 1 which is further characterized in that said valve spring retainer comprises an annular body portion encircling said tapered sleeve with a clearance space being provided therebetween, and radially inwardly and outwardly extending flanges respectively at opposite ends of said annular body portion, said radially outwardly extending flange supporting said valve spring and said radially inwardly extending flange being seated upon the end of said tapered sleeve facing the head of the valve.

3. The structure defined by claim 1 which is further characterized in that said valve spring retainer comprises an annular body portion encircling said tapered sleeve with a clearance space being provided therebetween, and radially inwardly and outwardly extending flanges respectively at opposite ends of said annular body portion, said radially outwardly extending flange supporting said valve spring and said radially inwardly extending flange being seated upon the end of said tapered sleeve facing the head of the valve, the frictional engagement between the radially inwardly extending flange of said valve spring retainer and the end of said tapered sleeve being substantially in a radial plane, and the outer corner of the last-mentioned end of said tapered sleeve being chamfered so that the entire zone of frictional contact between the valve retainer and the sleeve is closely adjacent the periphery of the valve stem and has an outer radius less than half the radius of the valve spring.

4. A valve assembly for an internal combustion engine comprising a poppet valve having an enlarged head and an elongated cylindrical stem, said stem having an annular groove formed in its periphery near one end thereof, split keys embracing said stem and having tongues entering said annular groove to prevent relative axial movement therebetween, an annular sleeve encircling and embracing said split keys to hold the latter in position upon said valve stem, said split keys and said annular sleeve having cooperating means holding said sleeve against axial movement away from the head of the valve, the end of said sleeve facing the head of the valve lying in a radial plane and being located closely adjacent the periphery of the valve stem, a valve spring retainer seated upon the last-mentioned end of said sleeve, and a valve spring having one end supported upon said valve spring retainer in a zone radially outwardly of the zone of engagement between said retainer and said sleeve.

EARLE STEELE MacPHERSON.

REFERENCES CITED

The following references are of record in the file of this patent:

UNITED STATES PATENTS

| Number | Name | Date |
|---|---|---|
| 1,160,028 | Wright | Nov. 9, 1915 |
| 1,183,852 | Buck | May 23, 1916 |
| 1,297,342 | Garlick | Mar. 18, 1919 |
| 1,618,045 | Bahan et al. | Feb. 15, 1927 |